US007017042B1

(12) United States Patent
Ziai et al.

(10) Patent No.: US 7,017,042 B1
(45) Date of Patent: Mar. 21, 2006

(54) METHOD AND CIRCUIT TO ACCELERATE IPSEC PROCESSING

(75) Inventors: Syrus Ziai, 1762 Heron Ave., Sunnyvale, CA (US) 94087; Greg Grohoski, Austin, TX (US); Craig Robson, Sunnyvale, CA (US); Tim Barry, Fort Collins, CO (US); Paul Hartke, Stanford, CA (US)

(73) Assignee: Syrus Ziai, Sunnyvale, CA (US)

( * ) Notice: Subject to any disclaimer, the term of this patent is extended or adjusted under 35 U.S.C. 154(b) by 835 days.

(21) Appl. No.: 09/882,428

(22) Filed: Jun. 14, 2001

(51) Int. Cl.
*H04L 9/00* (2006.01)
*H04K 1/00* (2006.01)

(52) U.S. Cl. ............................ 713/161; 713/189; 726/1
(58) Field of Classification Search ................ 713/161, 713/153, 189, 160, 151, 165, 201; 726/14; 707/3; 370/389, 395.31, 201; 709/235; 711/119, 125
See application file for complete search history.

(56) References Cited

U.S. PATENT DOCUMENTS

| 6,253,321 | B1 * | 6/2001 | Nikander et al. ........... 713/160 |
| 6,477,646 | B1 * | 11/2002 | Krishna et al. ............. 713/189 |
| 6,708,218 | B1 * | 3/2004 | Ellington et al. ........... 709/236 |
| 6,725,371 | B1 * | 4/2004 | Verhoorn et al. ........... 713/161 |
| 6,772,348 | B1 * | 8/2004 | Ye ............................... 713/201 |
| 6,839,346 | B1 * | 1/2005 | Kametani .................... 370/389 |
| 2002/0083344 | A1 * | 6/2002 | Vairavan ...................... 713/201 |
| 2002/0199101 | A1 * | 12/2002 | Krishna et al. ............. 713/161 |
| 2003/0014627 | A1 * | 1/2003 | Krishna et al. ............. 713/153 |
| 2004/0243853 | A1 * | 12/2004 | Swander et al. ............ 713/201 |

OTHER PUBLICATIONS

U.S. Appl. No. 60/159,012, filed on Oct. 12, 1999.*
U.S. Appl. No. 60/142,870, filed on Jul. 8, 1999.*
Cryptography and Network Security: Principles and Practice—$2^{nd}$ Edition by William Stallings.
Internetworking with TCP/IP Principles, Protocols, and Architectures—$4^{th}$ Edition by Douglas E. Corner pp. 1-750.

* cited by examiner

*Primary Examiner*—Hosuk Song
*Assistant Examiner*—Linh Ld Son
(74) *Attorney, Agent, or Firm*—Blakely, Sokoloff, Taylor & Zafman, LLP (57) ABSTRACT

Methods and apparatus' for performing IPSec processing on an IP packet being transmitted onto a network and being received from a network are described. The methods and apparatus' further described perform IPSec processing inline which results in a reduced number of transfers over the system bus, reduced utilization of system memory, and a reduced utilization of the system CPU. An IP packet which requires IPSec processing enters an acceleration device. In one embodiment, the acceleration device is coupled to a security policy database (SPD) and security association database (SAD). IPSec processing is performed at the acceleration device without sending the IP Packet to system memory for processing.

4 Claims, 8 Drawing Sheets

METHOD AND CIRCUIT TO ACCELERATE IPSEC PROCESSING

FIELD OF INVENTION

The field of the invention relates to encryption/decryption technology, generally. More specifically, the field of invention relates to Internet Protocol Security (IPSec) technology.

BACKGROUND OF THE INVENTION

In recent years, network bandwidth has been increasing much faster than the speed of processing systems, such as computer systems and other systems that communicate with such networks. Increases in network bandwidth have been a result of new technologies and standards for both wide area networks (WANS) as well as for local area networks (LANs). WAN technologies such as SONET (synchronous optical networks) using DWDM (dense wavelength division multiplexing) have resulted in several orders of magnitude increase in available bandwidth over the span of only a few years. Similarly, LAN technologies such as gigabit Ethernet and ten gigabit Ethernet on copper and optical fiber have increased available network bandwidth by two orders of magnitude relative to standard 10- and 100-megabit Ethernet standards. During the same time period, the computational power of computers and other systems has been doubling about every 18 months. Because of the disparity between the processing speed of communication chips and the bandwidth of underlying network technologies to which they connect, many devices attached to networks cannot exploit the full bandwidth because of the lack of processing power on these devices.

Figure 6:
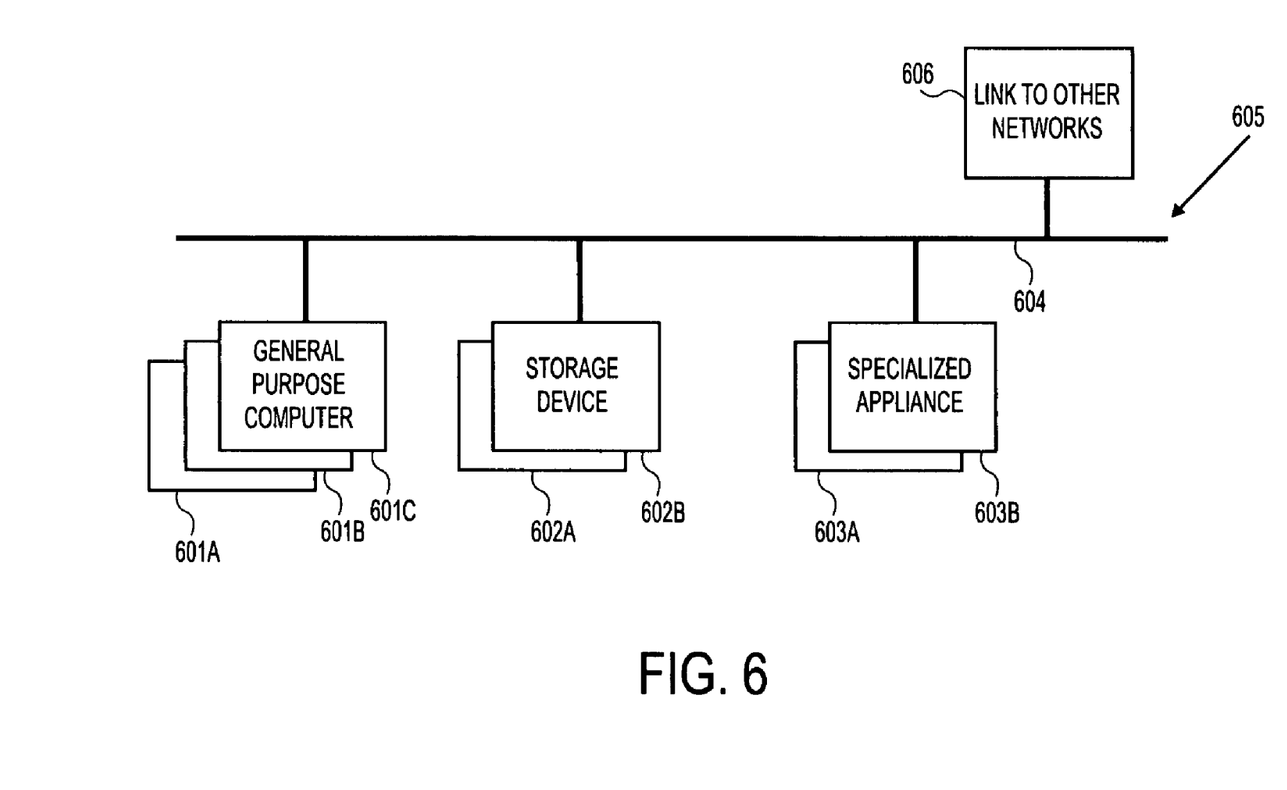
FIG. 6 shows an example of a local area network.

FIG. 6 shows an example of a local area network. The devices on the local area network can include general purpose computers, such as computers 601a, 601b, and 601c, as well as storage devices such as network storage devices 602a and 602b, as well as appliances for performing specialized functions, such as data caching and load balancing or other custom processing (see specialized appliances 603a and 603b). The actual communication path, whether by copper wire, optical fiber or wireless, can be implemented in a variety of topologies, such as switches, rings, or buses such as the bus 604 shown for the local area network 605. The local area network typically also includes a link 606 which may be a gateway system to other networks, such as the Internet.

The most common implementation of a local area network in use today is TCP/IP on Ethernet (or IEEE 802.3). TCP is a reliable, connection oriented stream protocol that runs on top of IP which is a packet based protocol. UDP is a datagram oriented protocol running on top of IP. Thus, processing systems, such as computer systems in a computer network typically transmit information over the network in the form of packets. A number of different packet based protocols have been defined to enable interconnected network computers to communicate with each other. Generally, the network protocol requires each processing system connected to the network to check, process and route control information contained in each information packet.

Figure 1:
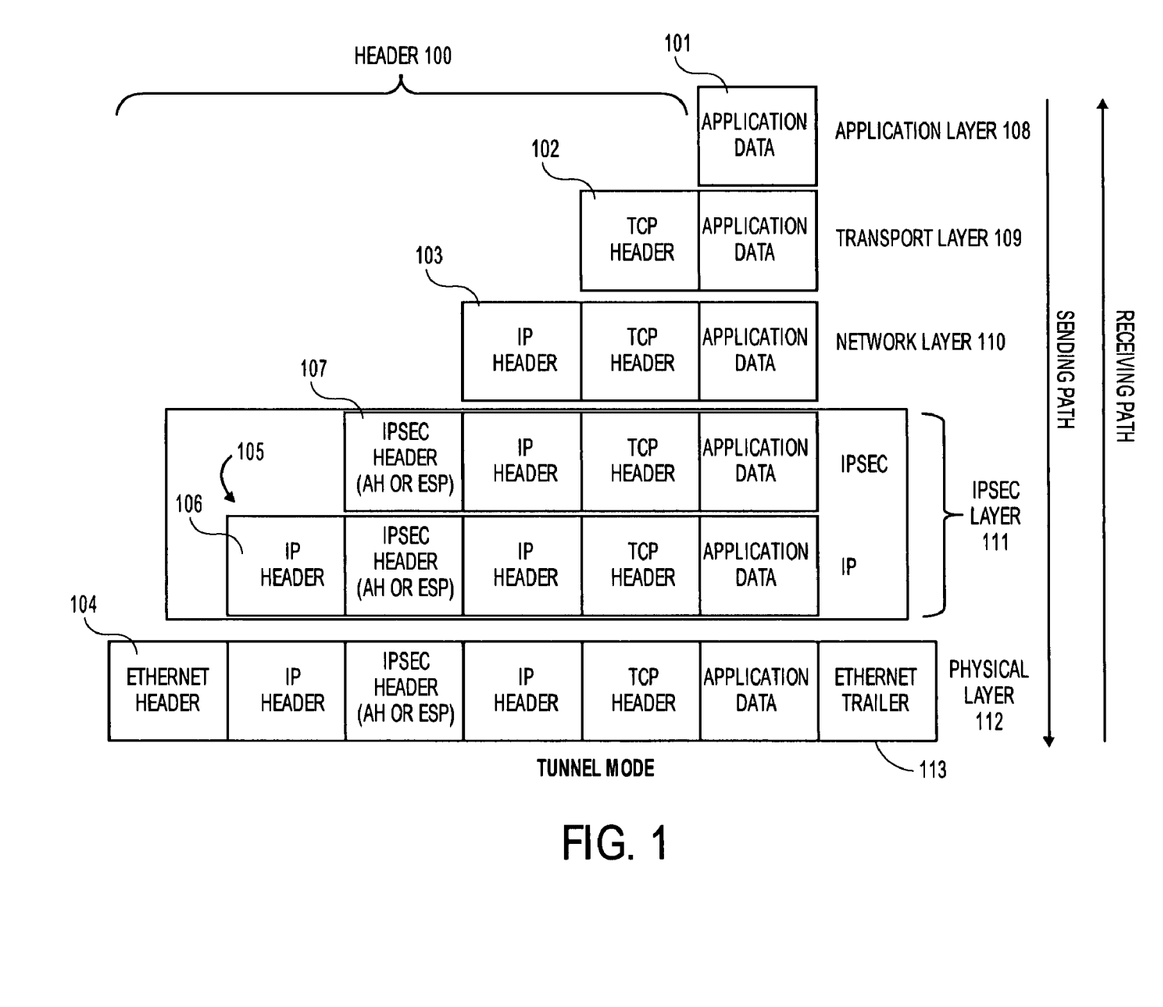
FIG. 1 shows a TCP/IP protocol stack with IPSec in tunnel mode.

An application program which is executing on a computer, such as a general purpose computer which is coupled to the network, may need to send data to another device on the network. A common way is for the application program to make a call to a network protocol stack socket interface, which calls the TCP/IP and the Ethernet drivers. Data is encapsulated first by a TCP (Transmission Control Protocol) header, subsequently by an IP (Internet protocol) header, and lastly by an Ethernet header as shown in FIG. 1. The application data 101 may be text or graphics or a combination of text and graphics or video/motion pictures or other types of data. As shown in FIG. 1, the TCP header 102 is appended to the application data 101 and then the IP header 103 is appended to the combination of the application data 101 and the TCP header 102. Finally, the Ethernet driver appends an Ethernet header 104 and an Ethernet trailer 113. After the Ethernet driver has completed the encapsulation process, the entire packet (containing 101, 102, 103, 104, and 113) is transmitted over the communication medium of the network, which may be a copper wire, optical fiber, or wireless or other communication media to another device which is coupled to the network. The receiving device goes through the reverse sequence.

Much of the information transmitted across the Internet according to the Transmission Control Protocol/Internet Protocol (TCP/IP) is vulnerable to eavesdropping and tampering. IPSec is an extension of the TCP/IP suite of protocols, as described in more detail below. An IPSec header 107 may be included in the header field 100. Various "physical layer" headers, such as an Ethernet header 104, may also be added. The TCP header 102 handles the flow of application data between two systems. The IP header 103 helps determine the path according to which data is moved around in the network.

Any system connected to the Internet may intercept, replay or reproduce an IP packet. There has thus been a growing demand to protect Internet transmissions, while using the existing infrastructure. Responding to that demand, IPSec (IP security protocol) has been standardized by the Internet Engineering Task Force (IETF). IPSec is an enhancement to the TCP/IP suite of network protocols for secure communication between two devices. As shown in FIG. 1, the IPSec approach encrypts an IP packet and encapsulates it into a new IP packet 105 having an IPSec header 107 and a second IP header 106. The new IP packet 105 may also be referred to as an IPSec packet or an IPSec datagram.

IPSec (Internet Protocol Security) protocols are designed to provide authentication, data integrity, anti-replay and confidentiality services to both the current (IPv4) and the next-generation (IPv6) Internet Protocols (as well as others that may be added in the future). Two IPSec headers (AH and ESP) are implemented to provide these services. Referring to FIG. 1, the IPSec header 107 may be either AH or ESP. The AH (Authentication header) provides the services of authentication and data integrity, as well as an anti-replay mechanism. The ESP (Encapsulating Security Payload) provides confidentiality as well as a partial form of traffic flow confidentiality.

There are two modes of use for the AH and ESP protocols. The two modes are "transport mode" and "tunnel mode." According to *Cryptography and Network Security: Principles and Practice—2nd edition*, by William Stallings, "ESP in transport mode encrypts and optionally authenticates the IP payload but not the IP header. AH in transport mode authenticates the IP payload and selected portions of the IP header. ESP in tunnel mode encrypts and optionally authenticates the entire inner IP packet, including the inner IP header. AH in tunnel mode authenticates the entire inner IP packet and selected portions of the outer IP header." (Stallings, William. *Cryptography and Network Security: Principles and Practice—2nd edition* p. 407–408).

Figure 2:
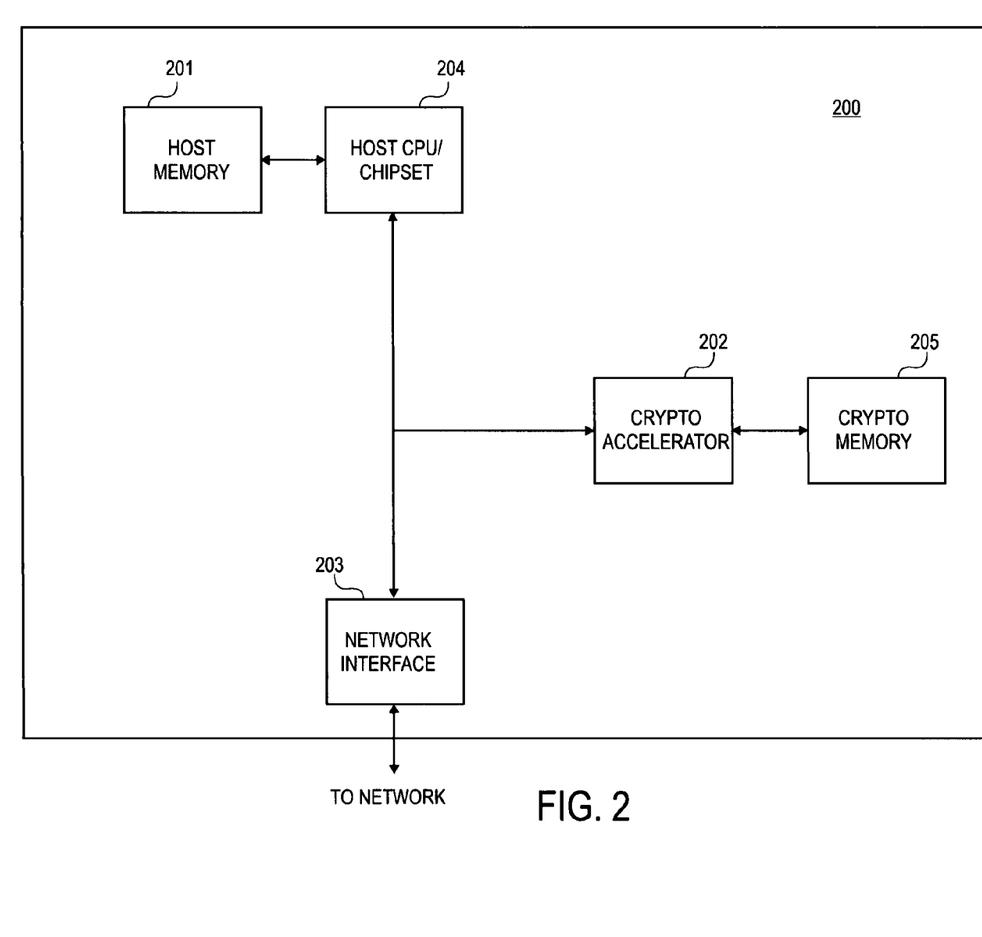
FIG. 2 shows an existing architecture used to perform IPSec processing.

Referring to FIG. 2, to accomplish the IPSec encryption, decryption, or authentication the acceleration device 202 uses various algorithms (DES, RC4, MD5, SHA-1, etc). These algorithms are computationally intense. Custom circuits optimized to accelerate computation may be developed to enhance the IPSec process. Such circuits can achieve 1–2 orders of magnitude higher computational throughput as compared to typical microprocessor arithmetic logic units (ALUs) configured to perform the encryption or decryption in software. The acceleration device 202 shown in the receiving system 200 of FIG. 2, is an example of such an acceleration device.

A problem with the scheme in FIG. 2, is the memory bandwidth and system interconnect bandwidth required to move data between its storage location 201 and the acceleration device 202. In devices such as the one shown in FIG. 2, IPSec datagrams arrive at the network interface 203 and are sent in encrypted form to the system memory 201 (via system cpu/chipset 204). The system cpu/chipset 204 then dispatches the datagram and associated control information to the acceleration device 202 for decryption. The acceleration device 202 then decrypts the packet and sends it back to the system cpu/chipset 204 for processing/removal of the IP and TCP headers 103, 102 (as seen in FIG. 1) and delivery of the application data 101 to the system.

An aspect of improving IPSec technology can focus on the architecture/method and circuits used to perform the IPSec processing by minimizing the bandwidth used in various system resources (DRAM bandwidth, system bus bandwidth, etc.). Decreasing system bandwidth utilization for IPSec processing acceleration leaves more bandwidth for the system to perform other tasks.

BRIEF DESCRIPTION OF THE DRAWINGS

The present invention is illustrated by way of example and not limitation in the figures of the accompanying drawings, in which like references indicate similar elements, and in which:

FIG. 3b shows a method that may be performed by the architecture of FIG. 3a.

FIG. 3c shows a method that may be performed by the architecture of FIG. 3a.

FIG. 4 shows a more detailed depiction of the embodiment of FIG. 3a.

DETAILED DESCRIPTION

Embodiments of the present invention (as described below as well as others) may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

The present discussion describes an approach that increases bandwidth within a receiving system or a transmitting system. This reduces the chance of a receiving system or a transmitting system with a connection to a high bandwidth network, such as a gigabit Ethernet, from having its various system interconnects act as a bottleneck. A bottleneck refers to the inability of hardware to handle the amount of traffic it is responsible for handling. A bottleneck results in a slowing or lessening of the throughput of a receiving system or transmitting system.

Figure 3A:
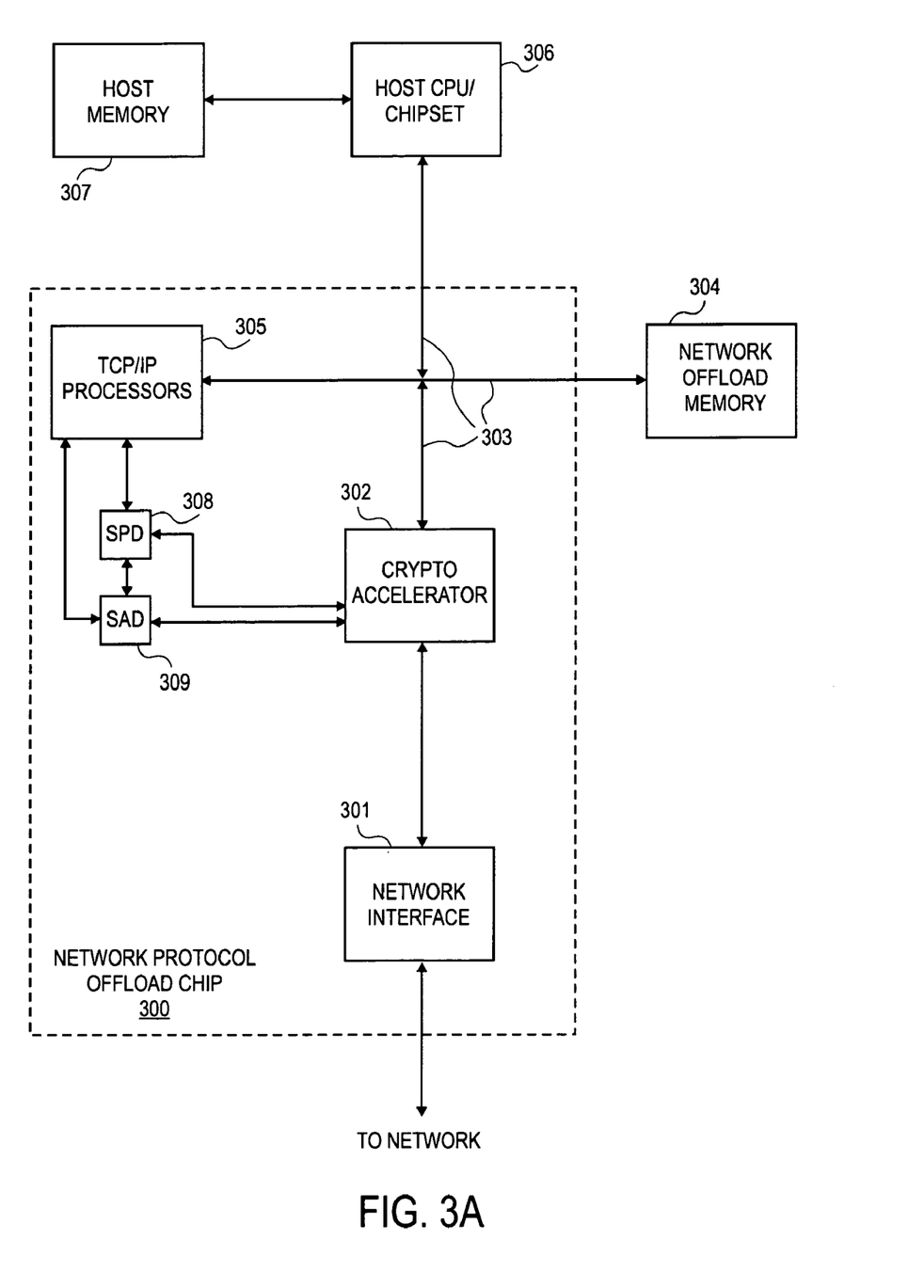
FIG. 3a shows one embodiment of an architecture to perform IPSec processing according to the invention.
Figure 3B:
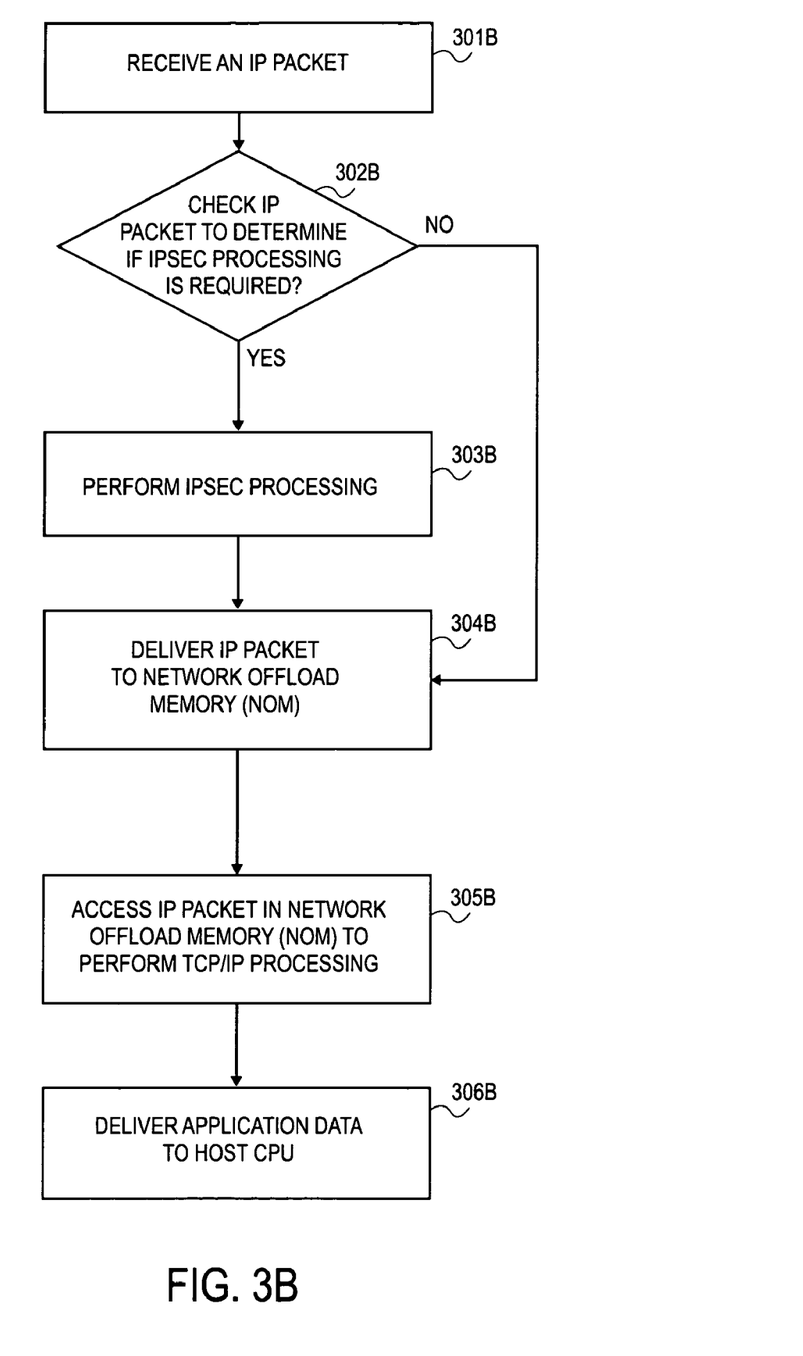
Figure 3C:
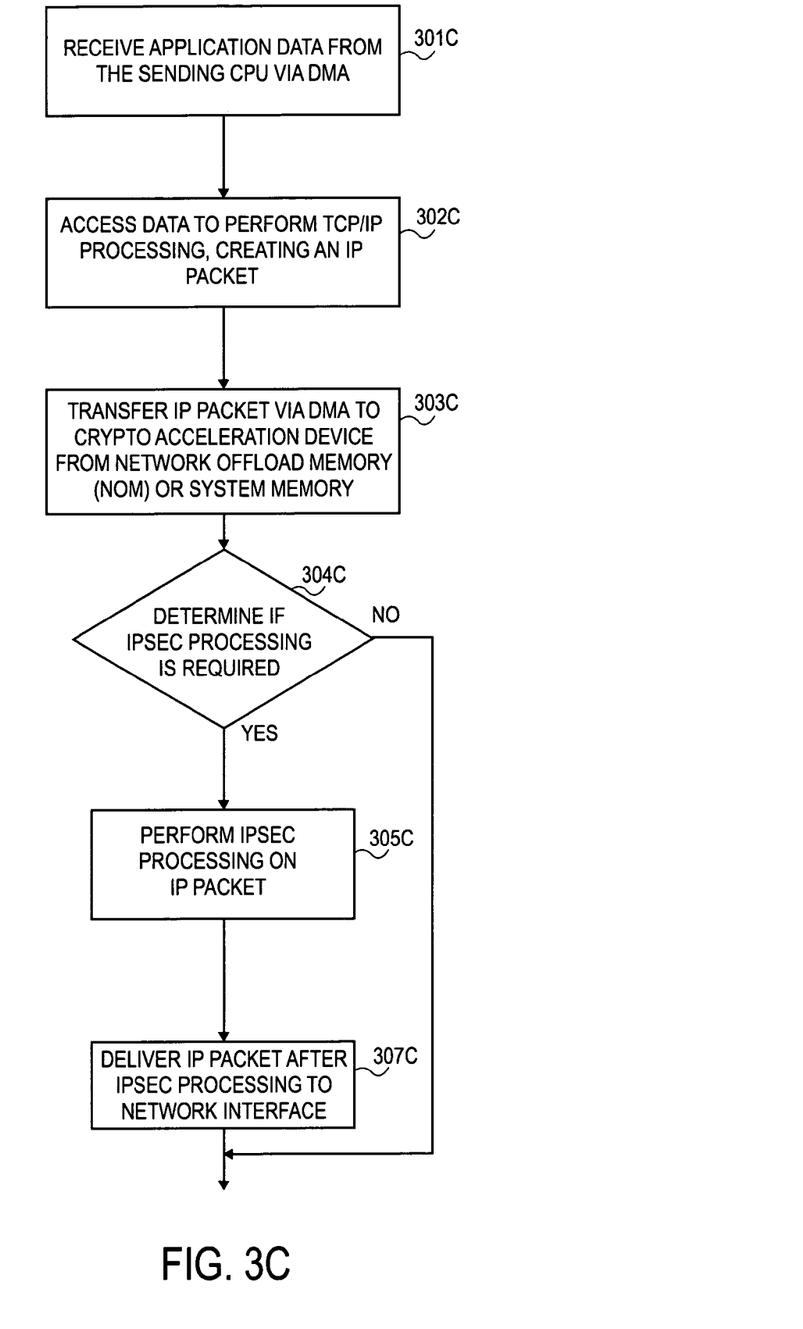
Figure 5:
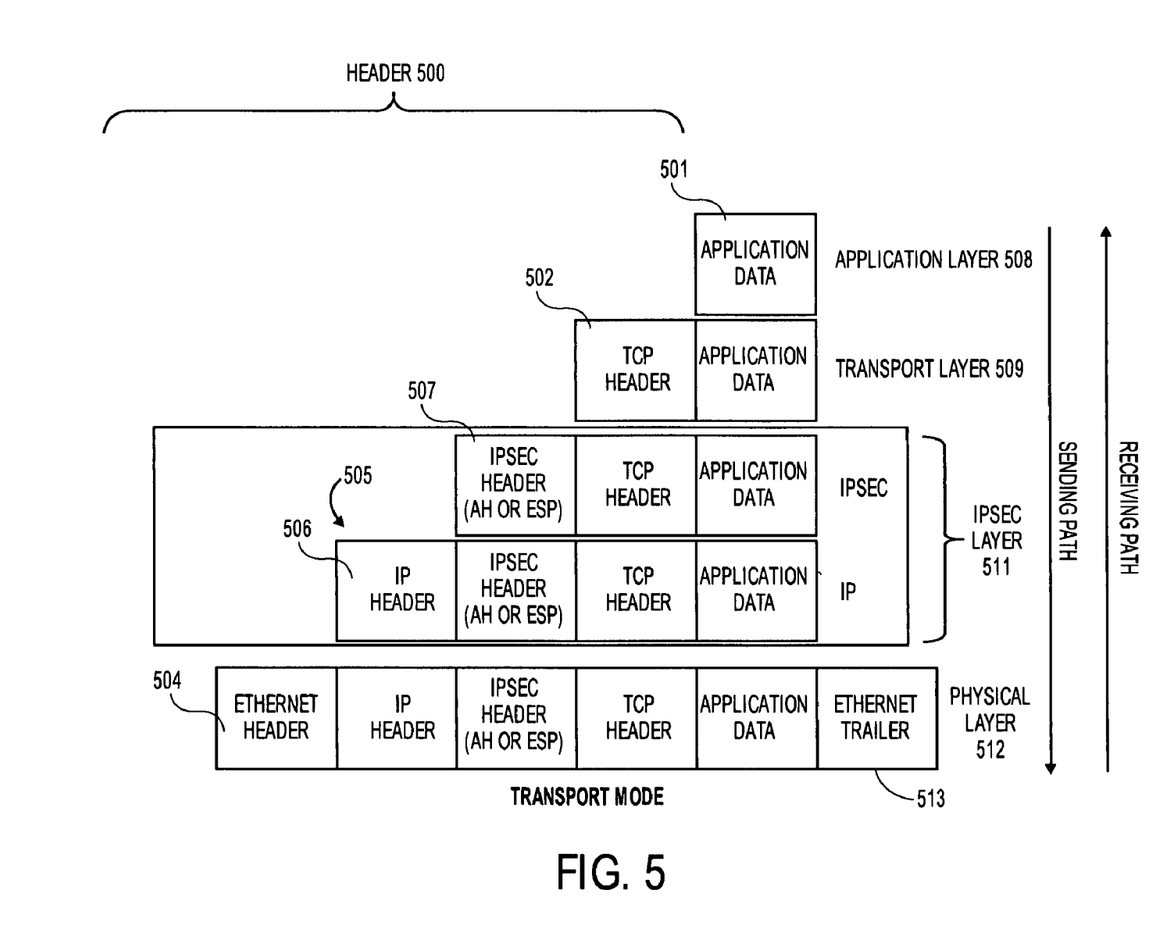
FIG. 5 shows a TCP/IP protocol stack with IPSec in transport mode.

FIG. 3a shows an embodiment of an architecture for a receiving system or a transmitting system. A corresponding embodiment of a method for performing IPSec processing on an inbound IPSec packet is shown in FIG. 3b. A corresponding embodiment of a method for processing an outbound IPSec packet is shown in FIG. 3c. The embodiment disclosed herein, applies to IPSec processing in tunnel mode (FIG. 1) and IPSec processing in transport mode (FIG. 5).

Referring to FIGS. 1, 3a, 3b, and 4, inbound IP packets are received 301b by a network protocol offload chip 300 at the network interface 301. The IP packets are next checked 302b to determine if IPSec processing is necessary. If IPSec processing is necessary, the IPSec packet is sent to the acceleration device 302. In the inbound direction, IPSec processing is either the authentication or the decryption, or authentication and decryption of the inbound IPSec packet consistent with the IPSec protocols. In the inbound direction, IPSec processing results in the removal of the second IP header 106 (tunnel mode) and the removal of the IPSec header 107, leaving the first IP header 103, the TCP header 102, and the application data 101. Referring to FIG. 1 (tunnel mode) and FIG. 5 (transport mode), it is important to note that there is a second IP header 106 only in tunnel mode. As can be seen in FIG. 5, in transport mode, the IPSec header 507 encapsulates the TCP header 502 and the application data 501 at the IPSec layer 511. In transport mode there is only one IP header 505, and it is not encapsulated within an IPSec header.

Figure 4:
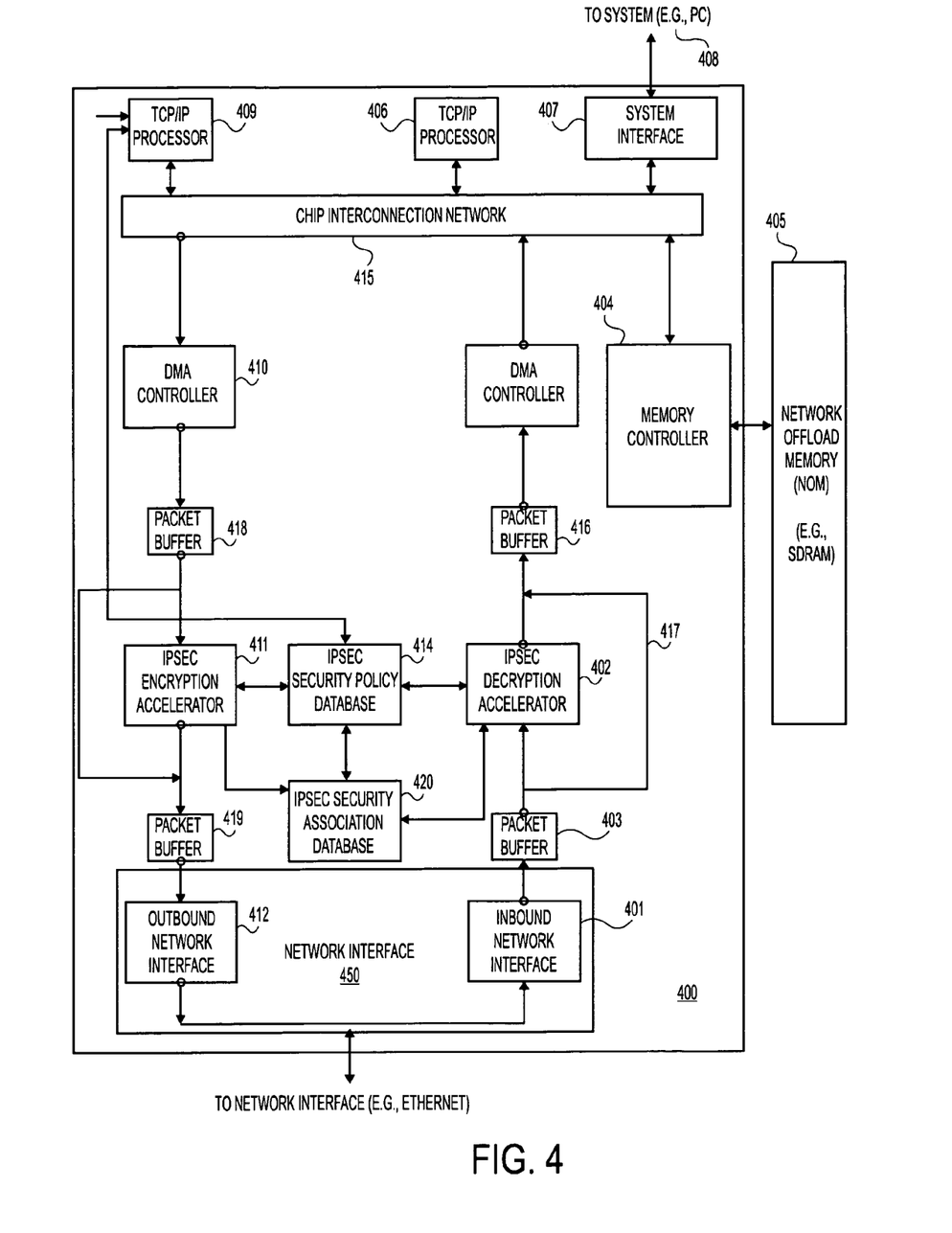

After IPSec processing 303b at the acceleration device 302, the IP packet is sent (e.g., via a Direct Memory Access (DMA)) 304b to the Network Offload Memory (NOM) 304. Information is transferred directly to and from memory by many devices over DMA channels. A DMA channel is a system pathway. DMA is a method to transfer large quantities of data, or to make high-speed transfers of data in which individual transfer cycles are not the responsibility of the system CPU. A separate DMA controller unit 404 may be used to manage each data transfer. Such autonomous activity may reduce the processing load on the CPU.

Next, the TCP/IP processors 305 access 305b the IP packet header and TCP/UDP packet header if tunnel mode is being used, or the TCP/IP processors 305 access 305b the TCP/UDP packet header if transport mode is used. The access 305b to perform the necessary TCP/IP processing, takes place in the NOM 304 (Note: payload contents do not need to be touched). The IP packet (tunnel mode) or TCP packet (transport mode) is not limited to being sent from the acceleration device 302 to NOM 304. In alternate embodiments, the IP packet may be sent from the acceleration device 302 to a system memory 307. In the inbound direction, TCP/IP processing is the removal of the first IP header 103 at the network layer 110, as well as reassembly, error detection, reordering, and removal of the TCP header 102 at the transport layer 109 consistent with the IP and TCP protocols. After TCP/IP processing is complete, only the application data 101 portion of the IP packet will be remaining in the NOM 304. In alternate embodiments a system memory 307, or an on-chip buffer, may be used in place of a NOM 304. The embodiments disclosed are not limited to using a system memory 307 or a NOM 304. The application data will be transferred (e.g. via Direct Memory Access) 306*b* to the system memory 307 (via the system CPU/chipset 306).

Referring to FIGS. 3*a* and 3*c*, outbound IP packets begin as application data within the system memory 307. The application data is then transferred (e.g. via Direct Memory Access) 301*c* by the system CPU/chipset 306 to the TCP/IP processors 305 (e.g., by writing the application data into the NOM 304 from the CPU/chipset 306 and reading the application data from the NOM 304 by the TCP/IP processors 305). In alternate embodiments the application data may be written into the outbound network interface 301. Then, the TCP/IP processors 305 perform TCP/IP processing 302*c* on the application data. In the outbound direction, TCP/IP processing is the addition of the TCP header 102 at the transport layer 109 and the addition of the first IP header 103 at the network layer 110, consistent with the TCP and IP protocols. In the outbound direction, TCP/IP processing results in the creation of an IP packet. In addition, the IP packet is checked to determine if IPSec processing is required. Thus, after TCP/IP processing, an IP packet is stored in NOM 304. In alternate embodiments the IP packet may be sent to the outbound network interface 301.

IPSec processing (e.g., encapsulate the IP packet with an IPSec header 107 and a second IP header 105 (second IP header needed only in tunnel mode)) is then performed 305*c* by the acceleration device 302 on the IP packets that require IPSec processing. The IPSec packet created as a result of the IPSec processing is next transferred 307*c* to the network interface 308. The network interface 301 will transmit the IPSec packet outbound to the network. If transport mode (see FIG. 5) is utilized, there is not a second IP header 105.

The network layer 110 (e.g., as embodied in TCP/IP Processor 305), for inbound packets, will receive IP packets from the IPSec layer 111 (e.g., as embodied within Acceleration Device 302) which have had IPSec processing performed on them. The network layer (e.g., as embodied in TCP/IP processor 305), for outbound packets, will send IP packets to the IPSec layer 111 (e.g., Acceleration Device 302) for IPSec processing. Before two devices can send and receive IP packets which require IPSec processing between each other, a secure connection must be established. This is known as a security association (SA). An SA acts similar to the terms of an agreement between two devices. An SA may define the security services that will be used between the two devices. Furthermore, an SA may also define the cryptographic algorithms and the keys that will be used in IPSec processing.

Referring to FIG. 3*a*, the security association may be recorded in a security association database (SAD) 309 for each device. An SAD 309 is a database that contains all the SA's that are currently set up with other devices. The security association database 309 may be split into two parts, one for incoming traffic and one for outgoing traffic. One method of establishing a SA, would be, a first system (e.g., a sending system) requests a secure connection to a second system (e.g., a receiving system) via a session initiation protocol. A set of handshakes establishes the methodology for "key" exchanges between the two system devices for their session. Once the handshake is complete, both devices can send data for a particular session as IPSec encrypted IP packets/datagrams. Other methods may exist.

Either system device can send or receive encrypted traffic. After the session is established, both devices designate a session as an IPSec enabled session in their corresponding Security Policy Database (SPD) 308. The SPD 308 is a table that can be maintained in the TCP/IP protocol stack that acts as a list of each IPSec enabled session. As such, the SPD 308 can be searched to determine if an incoming or outgoing IP packet requires IPSec processing.

The SPD 308 is indexed according to packet header information so that the policy for each packet sent/received from a system can be defined. The information used in a selector may include but are not limited to the destination IP address, source IP address, name, data sensitivity level, transport layer protocol, source port, and destination port (e.g., IP packet header information). The actions to be taken on the IP packet (i.e., its "policy") according to the SPD 308 include IPSec processing, bypass, or discard. IPSec processing indicates that IPSec processing should be performed on the packet. Bypass allows the IP packet to skip all IPSec processing. Discard notifies the system that it should discard this IP packet.

The attributes of the SPD 308 should point to its corresponding security association data (e.g., with SA reference number) if the policy indicates that IPSec processing is required. As such, when IPSec processing is required on an IP packet, there will be corresponding security policies found for that IP packet in the SAD 309 (e.g., the SA data to be applied to the packet may be looked up in reference to the SA reference number provided by the SPD 308). The SPD 308 may have two parts, one for incoming traffic and one for outgoing traffic. In alternate embodiments, the SPD 308 and SAD 309 may be contained in one database or two databases. Furthermore, in alternate embodiments, the SPD 308 and SAD 309 may be contained within a memory chip or within multiple memory chips. In still further embodiments, the SPD 308 and SAD 309 may be maintained within a register or within multiple registers.

Referring to FIGS. 1, and 3*a*, for outbound packets, after the IP packet has had the first IP header 103 applied at the network layer 110 (i.e., IP processing at TCP/IP processor 305), the header of the IP packet is indexed against the SPD 308 to determine if IPSec processing is required. If IPSec processing is required, the network layer 110 will send the packet to the IPSec layer 111 (e.g., Acceleration Device 302) for IPSec processing (e.g., encryption of the IP packet). The IPSec layer 111 (e.g., Acceleration Device 302) will then check the SAD 309 to find the SA data that applies to this IP packet.

After retrieving the correct SA data, the IPSec processing (e.g., encryption or authentication) that is applicable to the packet will be performed on the IP packet and an IPSec header 107 (i.e., ESP or AH) will be added to the IP packet. After the IPSec header 107 has been added, a second IP header 106 is added to the IP packet (only in tunnel mode). This data structure 105 may be referred to as an IPSec packet. After IPSec processing, the IPSec packet passes to the link layer 112 (e.g. network interface 301). At the link layer 112, another header (e.g. Ethernet header 104) is added to the IPSec packet. The outbound IPSec packet with IPSec processing is now transmitted from the network interface 301 to the network and towards its destination address. Note that if the SPD 308 for a packet indicates IPSec processing is not to be performed (e.g., "bypass"), the IP packet is sent directly to the network interface 301. Also, a second IP header 106 is only added if tunnel mode (FIG. 1) is utilized. If transport mode (FIG. 5) is utilized, there will not be a second IP header.

The receiving path goes through a similar sequence. The incoming packet (e.g., either an IP packet or IPSec packet) is received at the physical layer 112 (e.g., Network Interface 301). After receiving a packet, the IPSec layer 111 (e.g. Acceleration Device 302) indexes the header information of the packet against the SPD 308 to determines if IPSec processing is required (and if so, obtains an SA number for the packet). If IPSec processing (e.g. decryption) is required, the IPSec layer 111 (e.g., Acceleration Device 302) will use the SA number in the SAD 309 and retrieve the SA data for the IP packet.

After IPSec processing at the IPSec layer 111, the IPSec header (ESP or AH) 107 will be removed and the second IP header 106 will also be removed (The second IP header is only used in tunnel mode). As such, the received IPSec packet will be converted to a typical IP packet. Next, the IP packet is passed to the network layer 103 (e.g., TCP/IP processor 305) for processing of the first IP header 106. The network layer 110 will check the IP packet's validity, delete the first IP header 103, and then forward the packet to the transport layer 109 (e.g. TCP/IP processor 305) where it will be handled by the appropriate transport protocol as designated by the TCP header (e.g. TCP, UDP, etc.) 102. After processing is completed at the transport layer 109, and the TCP header 102 has been removed, the packet is forwarded to the application layer 108 and from there the application data 101 is forwarded to the appropriate application by way of the CPU 306.

A more detailed embodiment of the processing for inbound IP packets requiring IPSec processing is shown in FIG. 4. As IP packets are received by the network protocol offload chip's 400 inbound network interface 401 network interface logic 450 will forward the received packets to the IPSec decryption accelerator 402 where the accelerator 402 will determine if IPSec processing is necessary. While the packets are waiting to be analyzed by the IPSec decryption accelerator 402, they will be placed in the inbound packet buffer 403. The inbound packet buffer 403 is acting as a queue. In the embodiment of FIG. 4, if the IPSec decryption accelerator 402 determines that the IP packet does not require IPSec processing, it will send (e.g. Direct Memory Access) the received packet to the Network Offload Memory 405, or to the system memory.

However, the IP packet is not limited to being analyzed for IPSec processing at the IPSec decryption accelerator 402. In an alternate embodiment, the Network Interface 450 could determine if IPSec processing is necessary. That is, logic could be added to the Network Interface 450 (e.g., coupled to the Security Policy Database 414) so that the Network Interface 450 would know if the packet was an IPSec packet. As such, the inbound packet buffer 403 could be a part of the inbound network interface 401 and packets received at the inbound network interface 401, could be placed in a queue to await a check by the Network Interface 450 to determine if IPSec processing is necessary. If the Network Interface 450 determined that the IP packet required IPSec processing, it would forward the IPSec packet to the IPSec decryption accelerator 402. If the Network Interface determined that the packet was not an IPSec packet, it would send the packet directly to Network Offload Memory 405 (e.g., by logic coupled to memory controller 404 and/or chip Interconnection Network 415). In alternate embodiments the packet would be sent to a system memory instead of a Network Offload Memory 405. In further alternate embodiments, the packet may be sent to a TCP/IP processor.

Once a packet's policy has been checked, the IPSec decryption accelerator 402, performs IPSec processing on the packets which require IPSec processing. An important point is that the IPSec decryption accelerator 402 is placed inline in the processing of the received packet. In addition, an IPSec decryption accelerator 402 may be coupled to a security policy database (SPD) 414 and an IPSec decryption accelerator 402 may be coupled to a security association database (SAD) 420. In one embodiment, the SPD 414 and the SAD 420 may be separate databases or a single database, and may consist of a single memory chip or multiple memory chips. In another embodiment, the SPD 414 and SAD 420 may be separate databases or a single database, and may exist within one register or in a multiple of registers.

The advantage of having an IPSec decryption accelerator 402 inline in the processing of an IPSec packet is that two memory copies may be eliminated in the IPSec processing of inbound IPSec packets. This reduction of memory copies will improve overall system performance.

Existing or previous embodiments have employed an approach as shown in FIG. 2, in which IP packets arrive at the network interface 203 and are sent in encrypted form to the system memory 201. The system CPU then dispatches the IPSec packet and associated control information from the system memory 201 to the crypto accelerator 202 for decryption. The decryption accelerator 202 then decrypts the IPSec packet and sends it back to the system 204 for TCP processing before the data is sent to the application.

The disadvantage of these schemes is the memory bandwidth and system interconnect bandwidth required to move data between its storage location 201 and the cryptographic acceleration device 202 used for IPSec processing. For devices with connections to high bandwidth networks, such as a gigabit Ethernet, the system interconnect in the computer system becomes a bottleneck. Referring to FIG. 4, by having the IPSec decryption accelerator 402 inline, the two memory copies needed in alternate embodiment described in FIG. 2 are eliminated. This elimination of memory copies saves bandwidth both on the system bus as well as the chip interconnection network 415.

Referring to FIGS. 3 and 4, after IPSec processing at the decryption accelerator 402, the IP packet is sent (e.g. Direct Memory Access) to the Network Offload Memory (NOM) 405. In addition, those IP packets which do not require IPSec processing may bypass 417 the IPSec Decryption Accelerator 402 and be transmitted (e.g. Direct Memory Access) to Network Offload Memory 405 or to system memory. To manage the flow of IP packets being transmitted to network offload memory 405, a second inbound packet buffer 416 will act as queue. One embodiment would place the inbound packet buffer 416 just before the DMA controller 404. However, the second inbound packet buffer 416 is not limited to being placed before the DMA controller 404. Next, the IP packet in NOM 405, is ready for TCP/IP processing. The IP packet in NOM 405 is accessed (e.g. Direct Memory Access) by the TCP/IP processor 406 for TCP/IP processing. An advantage here is that TCP/IP processing does not need to move or copy the data in memory since the decrypted packet was copied into a pre-allocated memory buffer (NOM 405) that will be used for TCP/IP processing. In alternate embodiments a system memory 307 may be used instead of a NOM 407.

During TCP/IP processing the network layer header (IP) and transport layer header (TCP or UDP) will be removed. Therefore, only data will remain in NOM 405 after TCP/IP processing. The remaining data in NOM 405 is sent (e.g. Direct Memory Access) to the system interface 407. From the system interface 407 the data will exit the network protocol offload chip 400 and be received by the system CPU 408.

An embodiment of the processing for outbound IP packets requiring IPSec processing is shown in FIG. 4. The system CPU 408 first sends application data to the network protocol offload chip 400. The system interface 407 receives the application data sent by the system CPU 408. The system interface 407 sends the data (e.g. Direct Memory Access) to NOM 405. Similar to the discussion above relating to TCP/IP processing on inbound IP packets, TCP/IP processing will take place on the data while it is NOM 405. The TCP/IP processor 409 accesses (e.g. Direct Memory Access) the application header data to perform TCP/IP processing.

The TCP/IP processor 409, after it has done the initial IP processing prior to transmission, will check the session parameters to see if this IP packet is to be converted into an IPSec packet. The TCP/IP will access the IPSec security policy database 414 in order to check the session parameter. In one embodiment, if the IP packet requires IPSec processing, the TCP/IP processor will set a control bit in a control word for a DMA engine 410 which feeds the IPSec encryption accelerator 411. The IPSec encryption accelerator 411 will check the control bit. If the control bit is set, IPSec processing takes place, and if the control bit is not set, the data flows through the IPSec encryption accelerator 411 without IPSec processing taking place.

However, the TCP/IP processor 409 is not limited to setting a bit in the DMA engine 410 which will be checked to determine if IPSec processing is required, other embodiments are possible. Another embodiment would involve the DMA engine 410 interpreting the control bit set by the TCP/IP processor 409, and only route outbound IP packets which have the bit set to the IPSec encryption accelerator 411, and bypass the accelerator 411 for other IP packets.

In order to regulate the flow of IP packets after TCP/IP processing IP packets may enter a buffer 418. The buffer 418 will act as a queue. In one embodiment, the buffer 418 may be placed after the DMA engine 410 and before the IPSec Encryption Accelerator 411.

Next, the IPSec encryption accelerator 411 will perform IPSec processing on the IP packets which require IPSec processing. The important point is that the IPSec encryption accelerator 401 is placed inline in the processing of the IP packet. In addition, the IPSec encryption accelerator 401 is coupled to an SPD 414 and to an SAD 420. The advantage of having an IPSec encryption accelerator 411 inline is that two memory copies may be eliminated in the IPSec processing of outbound IPSec packets. To explain it is helpful to refer to prior art.

Alternate embodiments have employed an approach as shown in FIG. 2, in which IP packets which require IPSec processing, are first sent via the system memory 201. The system CPU then dispatches the IP packet and associated control information from the system memory 201 to the crypto accelerator 202 for encryption. The crypto accelerator 202 then encrypts the IP packet and sends it back to the system 204 before the packet is sent to the network interface 203.

The disadvantage of these schemes is the memory bandwidth and system interconnect bandwidth required to move data between its storage location 201 and the cryptographic accelerator 202 used for IPSec processing. For devices with connections to high bandwidth networks, such as a gigabit Ethernet, the system interconnect in the computer system becomes a bottleneck. Referring to FIG. 4, by having the IPSec encryption accelerator 411 inline, the two memory copies needed in alternate embodiment described in FIG. 2 are eliminated. This elimination of memory copies saves bandwidth both on the system bus as well as the chip interconnection network 415. When IPSec processing is completed by the IPSec encryption accelerator 411, the IPSec packet is forwarded to the outbound network interface 412.

In order to regulate the flow of packets received at the outbound network interface 412, said packets will enter a buffer 419. The buffer 419 will act as a queue. In one embodiment, the buffer 418 may be placed after the IPSec Encryption Accelerator 411 and before the outbound network interface 412.

Next, the packet is transmitted off the network protocol offload chip 400 from the outbound network interface 412, and onto the network 413.

What is claimed is:

1. An apparatus, comprising:
an inbound IPSec packet processing path, comprising:
  i) inbound network interface logic circuitry to present an inbound IPSec packet to said inbound IPSec packet processing path after said inbound IPSec packet has been received at said apparatus;
  ii) inbound IPSec decryption logic circuitry to perform IPSec decryption processing on said inbound IPSec packet if said inbound IPSec packet warrants said IPSec decryption processing;
  iii) a first region of memory coupled to said inbound IPSec decryption logic circuitry, said first region of memory to store security policy information that indicates whether or not said inbound IPSec packet warrants said IPSec decryption processing;
  iv) a second region of memory coupled to said inbound IPSec decryption logic circuitry, said second region of memory to store IPSec security association information that indicates what said IPSec decryption processing entails;
  v) inbound DMA controller logic circuitry to place said inbound IPSec packet into an offload memory, said offload memory not being a memory where instructions and data evicted from said apparatus's Central Processing Unit's cache are initially stored;
  vi) a first inbound buffer coupled between said inbound network interface logic circuitry and said inbound IPSec decryption logic, said first buffer to hold said inbound IPSec packet before it is presented to said inbound IPSec decryption logic circuitry;
  vii) a second inbound buffer coupled between said inbound IPSec decryption logic circuitry and said inbound DMA controller, said second inbound buffer to present said inbound IPSec packet to said DMA controller; and,
  viii) a first path from said first inbound buffer to said second inbound buffer that flows through said IPSec decryption logic circuitry, a second path from said first inbound buffer to said second inbound buffer that does not flow through said IPSec decryption logic circuitry, said inbound IPSec packet to flow along said first path if said security policy information indicates that said inbound IPSec packet warrants said IPSec decryption processing, said inbound IPSec packet to flow along said second path if said security policy information indicates that said inbound IPSec packet does not warrant said IPSec decryption processing.

2. The apparatus of claim 1 further comprising:
an outbound IPSec packet processing path, comprising:
  i) outbound network interface logic circuitry to accept an outbound IPSec packet from said outbound IPSec packet processing path before said outbound IPSec packet is transmitted from said apparatus;

ii) outbound IPSec encryption logic circuitry to perform IPSec encryption processing on said outbound IPSec packet if said outbound IPSec packet warrants said IPSec encryption processing;

iii) a third region of memory coupled to said outbound IPSec encryption logic circuitry, said third region of memory to store outbound security policy information that indicates whether or not said outbound IPSec packet warrants said IPSec encryption processing;

iv) a fourth region of memory coupled to said outbound IPSec encryption logic circuitry, said fourth region of memory to store IPSec security association information that indicates what said IPSec encryption processing entails;

v) outbound DMA controller logic circuitry to fetch said outbound IPSec packet from said offload memory;

vi) a first outbound buffer coupled between said outbound DMA controller and said outbound IPSec encryption logic circuitry, said first outbound buffer to present said outbound IPSec packet to said IPSec encryption logic circuitry;

vii) a second outbound buffer coupled between outbound IPSec encryption logic and said outbound network interface logic circuitry, said second buffer to hold said outbound IPSec packet before it is presented to said outbound network interface logic circuitry; and, viii) a third path from said first outbound buffer to said second outbound buffer that flows through said IPSec encryption logic circuitry, a fourth path from said first outbound buffer to said second outbound buffer that does not flow through said IPSec encryption logic circuitry, said outbound IPSec packet to flow along said third path if said outbound security policy information indicates that said outbound IPSec packet warrants said IPSec encryption processing, said outbound IPSec packet to flow along said second path if said outbound security policy information indicates that said outbound IPSec packet does not warrant said IPSec encryption processing.

3. The apparatus of claim 2 wherein said inbound network interface logic circuitry comprises inbound Ethernet network interface logic circuitry and said outbound network interface logic circuitry comprises outbound Ethernet network interface logic circuitry.

4. The apparatus of claim 1 wherein said inbound network interface logic circuitry comprises inbound Ethernet network interface logic circuitry and said outbound network interface logic circuitry comprises outbound Ethernet network interface logic circuitry.

* * * * *